June 3, 1924.
J. D. DENBURGER
BRAKE
Filed Jan. 19, 1923
1,496,302
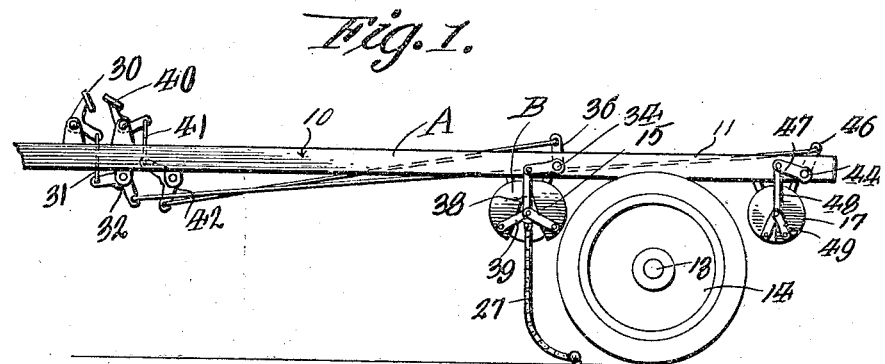
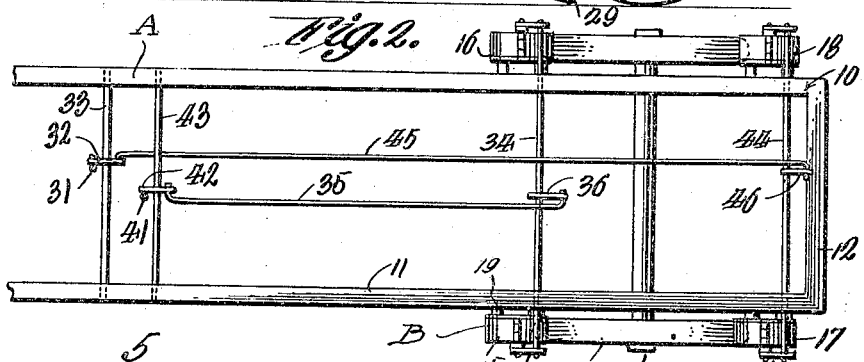
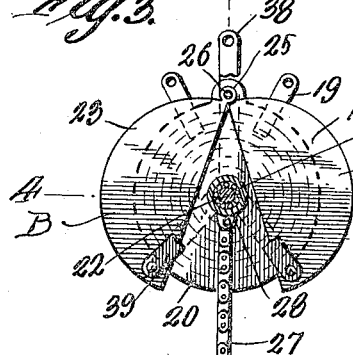
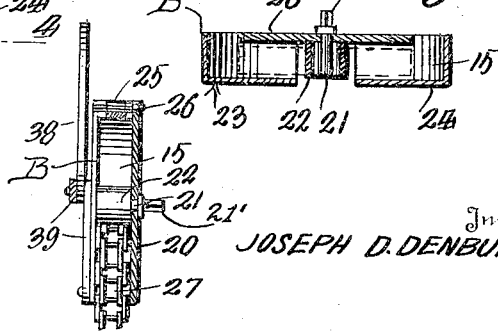
WITNESSES
Inventor
JOSEPH D. DENBURGER
By Richard B. Owen
Attorney Patented June 3, 1924.

1,496,302

UNITED STATES PATENT OFFICE.

JOSEPH D. DENBURGER, OF EAGLE CREEK, OREGON, ASSIGNOR OF ONE-FOURTH TO LEONARD M. DENBURGER AND CASPER C. LIEUALLEN, BOTH OF PORTLAND, OREGON.

BRAKE.

Application filed January 19, 1923. Serial No. 613,706.

*To all whom it may concern:*

Be it known that I, JOSEPH D. DENBURGER, a citizen of the United States, residing at Eagle Creek, in the county of Clackamas and State of Oregon, have invented certain new and useful Improvements in a Brake, of which the following is a specification.

This invention relates to attachment for vehicles and the primary object of the invention is to provide an auxiliary emergency brake for vehicles which can be instantly brought in use, when the ordinary brakes of the vehicle become inoperative from any cause.

Another object of the invention is to provide an improved auxiliary brake for vehicles embodying housings carried by the frame of the vehicle directly in front and in rear of the drive wheels of the vehicle having chains disposed therein, the housings being so constructed as to permit the dropping of the chains in front and in rear of the vehicle wheels so that the vehicle wheels can engage the same, which will bring about the stopping of the vehicle.

A further object of the invention is to provide novel means for operating the housings from the driver's seat of the vehicle to permit of the dropping of one end of the braking chains in front or in rear as the case may be of the drive wheels of the motor vehicle.

A still further object of the invention is to provide an improved braking device for motor vehicles, wagons, and the like of the above character, which will be durable and efficient in use, one that will be simple and easy to manufacture, and one which can be incorporated with a motor vehicle at a minimum cost.

With these and other objects in view the invention consists in the novel construction, arrangement and formation of parts, as will be hereinafter more fully described, claimed and illustrated in the accompanying drawings, in which:

Figure 1 is a fragmentary side elevation of a vehicle showing the improved auxiliary braking attachment incorporated therewith.

Figure 2 is a fragmentary plan view of a motor vehicle showing the improved auxiliary braking attachment connected therewith.

Figure 3 is an enlarged detail fragmentary side elevation of one of the housings carrying the braking chains, showing the housing in its open position to permit the dropping of the chain in front of the vehicle wheel.

Figure 4 is a detailed horizontal section through the braking attachment taken on the line 4—4 of Figure 3.

Figure 5 is a detail vertical section taken on the line 5—5 of Figure 3.

Referring to the drawing in detail, wherein similar reference characters designate corresponding parts throughout the several views, the letter A generally indicates a vehicle and B the improved auxiliary braking attachment therefor.

The vehicle A can be of any preferred character either of the horse-drawn type or of the motor driven type. As shown the same includes a chassis frame 10 having the longitudinally extending side beams 11 and the transverse end beam 12. The side beams 11 have associated therewith in any preferred manner the drive axle 13 supporting the ground engaging drive wheels 14. The drive wheels 14 can be provided with the usual or any preferred type of braking means (not shown).

The braking means B are adapted to be used as an auxiliary apparatus and it is evident that when the ordinary brakes fail through any reason that the auxiliary braking apparatus B can be utilized.

The braking apparatus B includes a pair of front housings 15 and 16 and a pair of rear housings 17 and 18. The housings 15, 16, 17 and 18 can be secured to the side panel beams 11 in any preferred way such as by depending hangers 19. Each of these housing 15, 16, 17 and 18 include a rear or inner disk-shaped wall 20 to which the hangers 19 are connected. The axial center of this disk-shaped inner wall 20 supports a shaft 21 on which is mounted a relatively small drum 22, the purpose of which will be hereinafter more fully described. Each shaft 21 is provided with a polygonal extension 21' for permitting a crank (not shown) to be associated therewith, so that the shaft and drum can be conveniently rotated. A pair of pivoted companion sections 23 and 24 forming a part of each housing is associated with the inner disk-shaped wall 20 and each of these sections include a semi-annular side wall and a semi-disk shaped outer wall. The upper ends of the sections 23 and 24 are provided with hinge barrels 25 which receive a supporting pivot bolt 26 carried by the inner disk-shaped wall 20. It is obvious that by this construction the sections 23 and 24 are free to swing toward and away from each other for permitting the braking chains 27 to drop out of the housings. These braking chains 27 can be of any desired construction and are secured at their inner ends as at 28 to the drums 22. The free ends of the chains 27 have secured thereto a suitable weight 29. The drums 22 can be rotated, such as by associating a crank, (not shown), with the polygonal ends 21' of the shafts, for winding up the chains 27 within their housings and each weight 29 is adapted to rest on the lower portions of the housings so that when the sections 23 and 24 are swung open the chains will be permitted to drop from the housings into the path of the wheels 14 whereby the wheels will be permitted to engage the same and thus bring about the effective stopping of the vehicle.

The housings can be open or closed in any preferred way and as shown a foot pedal 40 is provided for operating the front pair of housings 15 and 16 and a foot pedal 30 is provided for operating the rear pair of housings 17 and 18. The foot pedals 30 and 40 are of a substantially bell crank construction and their lower arms have connection by means of links 31 and 41 with the forward ends of the bell cranks 32 and 42 which are pivotally secured at their angles upon transverse supporting rods 33 and 43. The rear arms of the bell cranks 32 and 42 are connected respectively with rock shafts 44 and 34 through the medium of links or rearwardly extending operating rods 35 and 45. Each of the rock shafts 34 and 44 are provided respectively with upstanding crank arms 36 and 46 to which are secured respectively the operating rods 35 and 45. The outer terminals of the rock shaft 34 has connected thereto forwardly extending crank arms 37, which are connected through the medium of a depending bar 38 with pairs of operating links 39. As clearly shown in Figure 1 of the drawing the pairs of links 39 are connected respectively to the sections 23 and 24 of the front housings 15 and 16 and to the lower ends of the bars 38. The rock shaft 44 is connected in a similar manner to the sections 23 and 24 of the rear pair of housings 17 and 18 and as shown the terminals of the rock shaft 44 are provided with forwardly extending crank arms 47 carrying depending operating rods 48 which are connected to pairs of operating links 49 which are connected to the sections of the housings 17 and 18.

It is to be understood at this point that the chains 27 carried by the front pair of housings 15 and 16 are adapted to be employed to stop the forward motion of the vehicle and that the chains carried by the rear housings 17 and 18 are adapted to stop the rearward movement of the vehicle.

In operation of the improved braking attachment, when it is desired to stop the forward motion of the vehicle when the ordinary brakes become inoperative for many reasons the pedal 40 is depressed, which will rock the shaft 34 and thus swing the crank arms 37 downwardly, which in turn push down on the links 39 thus opening the sections 23 and 24 or moving the sections outwardly which will permit the dropping of the chains 27. These chains are of such a length that the same will be easily engaged by the wheels 14 and it is obvious that the chains will be drawn under wheels and as these chains are secured to their drums it can be seen that the rotation of the wheels will be checked.

When it is desired to stop the rearward movement of the vehicle the pedal 30 can be operated in the same manner as the pedal 40 just described.

From the foregoing description it can be seen that an improved and simple means has been provided for effectively stopping a vehicle when the ordinary brakes become inoperative from any cause.

Changes in details may be made without departing from the spirit or scope of this invention.

What I claim as new is:

1. The combination with a vehicle including a frame, ground wheels carried by the frame, of means for stopping the forward motion of the vehicle comprising a pair of sectional housings carried by the frame of the vehicle, chains disposed in said housings, and means for permitting the dropping of the chains in the path of said ground wheels, by the opening of said sectional housings.

2. The combination with a vehicle including a frame and ground wheels, of means for stopping the motion of the vehicle comprising housings including opposite swinging sections carried by the frame, chains having one of their ends rigidly secured to a part of the housing, and means for swinging the sections of the housings to an open position for permitting the dropping of the free ends of the chains in the path of the wheels.

3. The combination with a vehicle including a frame and ground engaging wheels, of an auxiliary braking attachment therefor including a pair of housings disposed in front of and in close proximity to the ground engaging wheels, drums rotatably mounted in said housings, chains normally wound about said drums and having their inner ends secured to said drums the lower ends of the chains resting on the lower portion of said housings and means for opening said housings to cause the chains to be projected into the path of said ground engaging wheels.

4. The combination with a vehicle including a frame and ground engaging wheels, of front and rear pairs of housings carried by the frame disposed respectively in front and in rear of said ground engaging wheels and in close proximity thereto, drums rotatably carried by each housing, chains wound about said drums and having their inner ends secured thereto, each of the housings including outwardly swinging sections to permit the dropping of the chains in the path of the ground engaging wheels and independent means for operating the front and rear pair of housings for permitting the dropping of the chains in the path of the wheels.

5. As a new article of manufacture, an auxiliary braking attachment for vehicles comprising a pair of transversely aligned housings, each of said housings including a pair of swinging sections, a rotatable drum disposed in the axial center of each housing, a chain normally wound about each drum and having its inner end secured thereto, a weight secured to the outer end of each chain, a rock shaft, means operatively connecting the rock shaft to the swinging sections of the housing, a foot pedal, and means for operating the rock shaft from the foot pedal.

In testimony whereof I affix my signature in presence of two witnesses.

JOSEPH D. DENBURGER.

Witnesses:
GRIFF KING,
W. A. HODGE.